United States Patent

[11] 3,556,185

| [72] | Inventor | Alfred Lykkeberg<br>2507-22nd Ave., San Francisco, Calif. 94116 |
|---|---|---|
| [21] | Appl. No. | 795,112 |
| [22] | Filed | Jan. 29, 1969 |
| [45] | Patented | Jan. 19, 1971 |

[54] MEAT SLICING MACHINE
6 Claims, 7 Drawing Figs.

[52] U.S. Cl. ........................................ 146/153, 146/157
[51] Int. Cl. ........................................ B26d 1/06, B26d 4/46
[50] Field of Search .......................... 146/112, 120, 130, 153, 154, 155, 157

[56] References Cited
UNITED STATES PATENTS
2,988,124  6/1961  Massengill ..................... 146/130X
3,078,893  2/1963  Drong ........................... 146/153
3,089,526  5/1963  Lykkeberg ..................... 146/153

FOREIGN PATENTS
687,585  2/1940  Germany.

*Primary Examiner*—Willie G. Abercrombie
*Attorney*—Lippincott, Gregg, Hendricson & Stidham ABSTRACT: An improved machine for the simultaneous multiple cutting of meat into slices incorporating in addition to a multiplicity of movable blades or saws a plurality of spiked rollers for the feeding of chunks of meat which may include bone into such blades or saws. The invention is particularly adapted for easy feeding and removal of meat and ready cleaning of the machine without the necessity of removing any portions thereof.

INVENTOR.
ALFRED LYKKEBERG

INVENTOR.
ALFRED LYKKEBERG

PATENTED JAN 19 1971
3,556,185
SHEET 3 OF 3
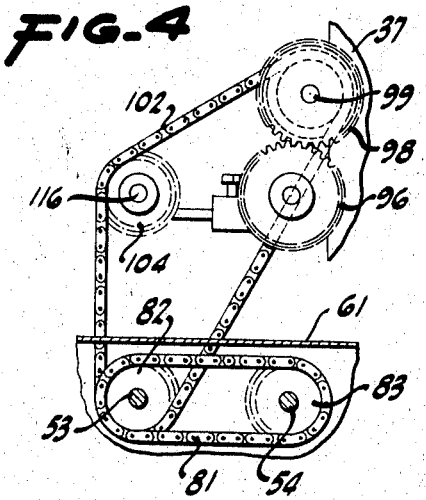
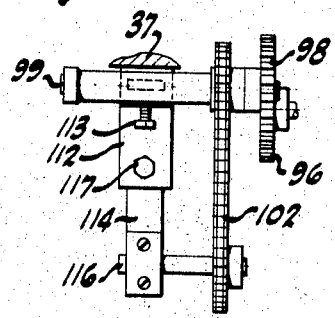
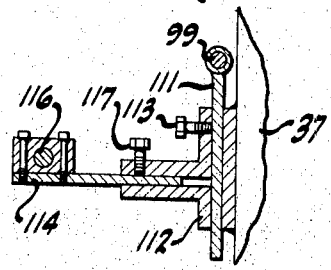
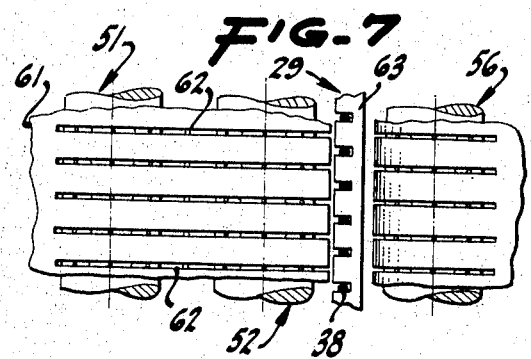
INVENTOR.
ALFRED LYKKEBERG
BY Lippincott, Gregg
Henderson & Stidham
ATTORNEYS

MEAT SLICING MACHINE

BACKGROUND OF INVENTION

Although there have been many attempts to develop truly practical meat slicing machines it is believed that the most relevant thereof is disclosed and claimed in my prior U.S. Pat. No. 3,089,526. Reference is made to this patent and the references cited therein as background for the present invention.

In many respects the present invention is similar to the machine of my above-identified patent and is in fact an improvement thereover. In brief, it is noted that the machine of such patent relates to the provision of a multiplicity of vertically movable blades or the like into which there is fed chunks or large pieces of meat which are sliced or cut thereby and subsequently fed from the machine for ultimate use. This type of machine is highly advantageous for many applications including institutional and armed service uses. In addition machines of this type are finding widespread application in the wholesale meat cutting industry wherein steaks, chops and the like are precut and prepackaged for distribution and retail sales.

It is believed apparent that mechanical handling and slicing or cutting of meat is highly advantageous in the provision of uniform slices and in greatly speeding up the operation of slicing and cutting. In common with the machine of my above-noted patent the present invention is capable of operation at high speeds with highly accurate slicing of meat into predetermined thicknesses and is readily adjustable for cuts of different thicknesses, Additionally the present invention provides a highly improved system and apparatus for the feeding of meat into moving blades whereby larger and more varied sizes of pieces or chunks may be handled by the meat slicing apparatus. A more positive feed of the meat into the blades is achieved hereby, as described below.

SUMMARY OF INVENTION

The invention described herein is an improvement in a machine for slicing meat as set forth in my above-noted U.S. Pat. No. 3,089,526. These improvements are particularly directed to the feeding of meat into slicing blades or saws and removal of sliced meat therefrom. In the feeding of meat into multiple slicing blades it is necessary that the meat be very firmly gripped and uniformly moved into the blades to prevent twisting or turning of the meat as it is cut. This is accomplished in the present invention by the provision of a plurality of spiked feed rollers.

More specifically to the present invention, there are provided a pair of lower spiked feed rollers driven by the meat cutting machine to rotate in a direction toward cutting blades or saws and spaced from each other in the direction of desired travel of the meat into the blades. The first of these rollers serves the purpose of initially gripping the meat to be sliced and moving same into engagement with upper and lower feed rollers that firmly hold the meat while feeding it into the multiple cutting blades or saws. A final feed roller on the opposite side of the cutting means draws the sliced meat away from same and out of the machine. The upper feed roller of the present invention is movable vertically with respect to the lower feed rollers so as to accommodate pieces or chunks of meat of varying size and particular provision is made for driven rotation of this upper roller in any of the adjusted positions thereof.

Not only do the feed rollers of the present invention provide an improved gripping of the meat for insuring more precise cutting or slicing thereof but also the structure is highly advantageous in being very readily cleaned following use. It is not necessary in the present invention to remove portions of the meat cutting machine for cleaning. It will be appreciated that inasmuch as the machine of this invention operates upon meat intended for human consumption it is necessary that highly sanitary conditions pertain at all times and consequently through cleaning of the machine is absolutely necessary. Many portions of this machine is absolutely necessary. Many portions of this machine are quite large and heavy as it is adapted to handle quite large chunks of meat and operate at high speeds. Consequently the necessity of dismantling any portions of the machine for cleaning is disadvantageous and this problem of prior art machines is entirely overcome hereby.

DESCRIPTION OF FIGURES

The present invention is illustrated as to a particular preferred embodiment thereof in the accompanying drawings wherein:

FIG. 4 is a transverse sectional view taken in the plane 4-4 of FIG. 2;

FIG. 5 is a transverse sectional view through the upper feed roller adjusting mechanism and taken in the plane 5-5 of FIG. 2;

FIG. 6 is a top plan view of the upper roller adjusting mechanism of FIG. 4; and FIG. 7 is a partial plan view of the lower feed and exit level of the machine taken in the plane 7-7 of FIG. 3.

DESCRIPTION OF PREFERRED EMBODIMENTS

Figure 1:
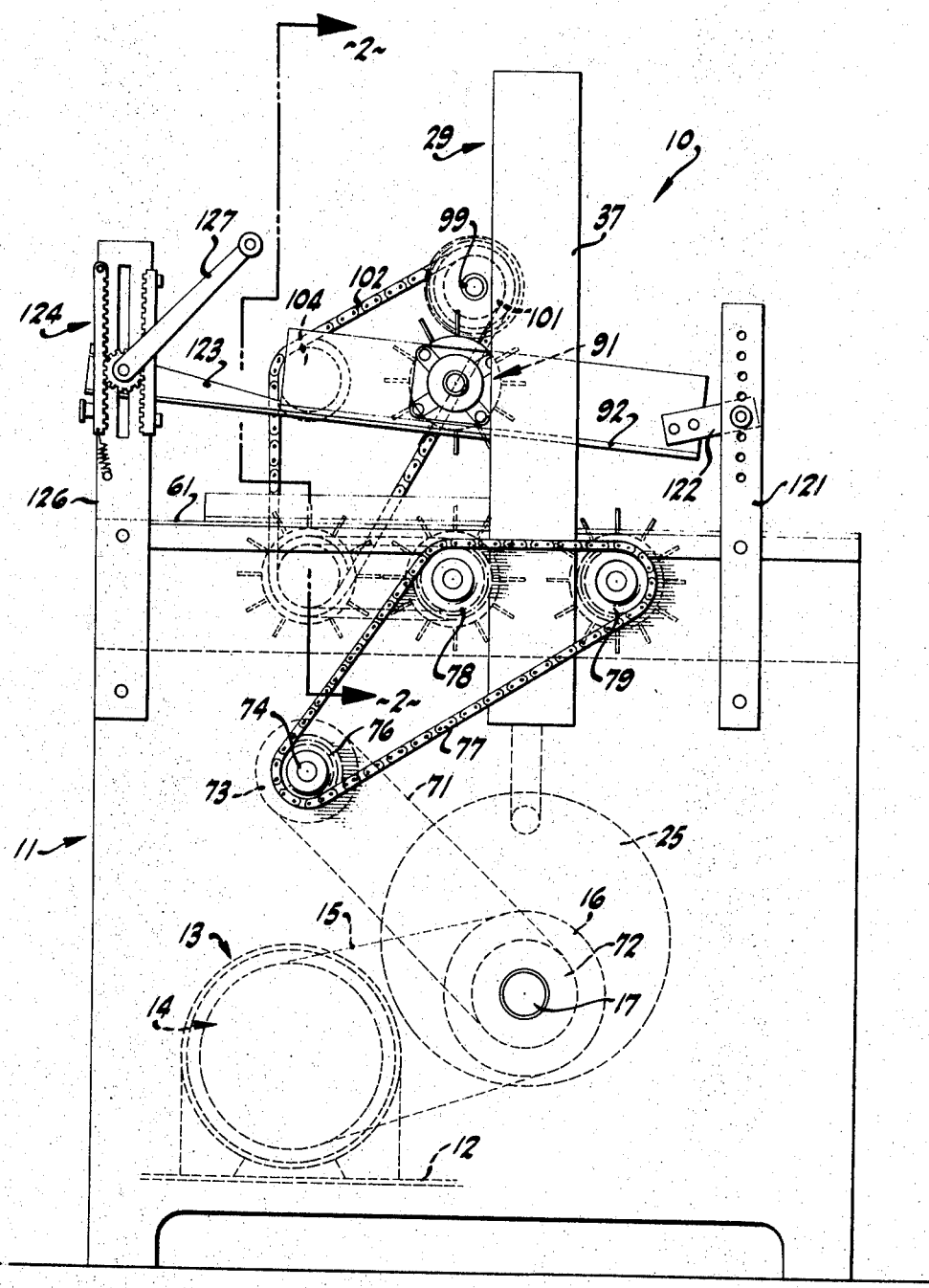
FIG. 1 is a side elevational view of a meat slicing machine in accordance with the present invention.

The present invention is in many respects quite similar to the machine of my above-noted U.S. Pat. No. 3,089,526, particularly with regard to the framework, drive means and meat slicing means. Although these elements are generally illustrated and referenced herein, attention is invited to such patent for a description of precise details thereof in one operable machine. In general, the machine 10 includes a framework or housing 11 with a base 12 upon which there is mounted a motor 13 having a sprocket 14 rotated thereby and a chain drive 15 extending about such sprocket 16 on a rotatably mounted shaft 17 journaled in the end wall of the framework. An eccentric 25 is mounted near each end of the shaft 17 for rotation therewith and each eccentric is provided with an annular groove or track 26 which acts as a track for a roller 27 at the bottom of a vertical member 28. A multiple blade assembly 29 is driven by the vertically members 28 disposed at opposite lateral sides thereof and reciprocated in vertical housing or framework channels 37 by the rotating eccentrics 25. The blade assembly 29 includes a plurality of vertically elongated blades or saws 38 which may be mounted in the the manner described in my above-noted patent so that the lateral spacing therebetween may be varied.

Figure 2:
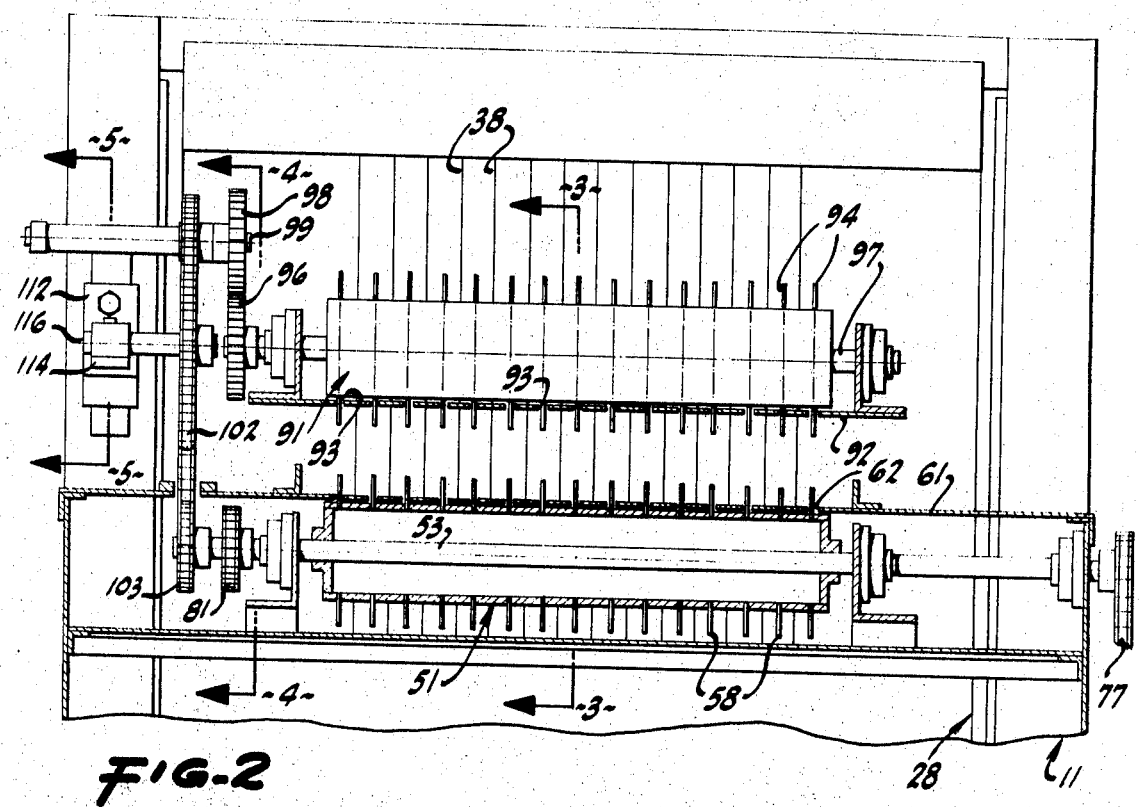
FIG. 2 is a front elevational view of the upper portion of the machine of FIG. 1 taken in the plane 2-2 of FIG. 1 and partially in section as illustrated.
Figure 3:
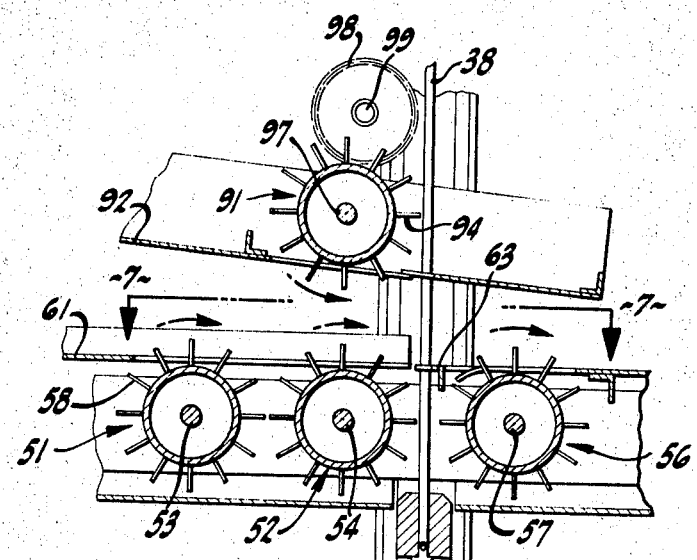
FIG. 3 is a transverse sectional view of the feed mechanism taken in the plane 3-3 of FIG. 2.

Considering now the improved feed means of the present invention and referring to FIGS. 1, 2 and 3 of the drawings there will be seen to be provided a pair of spaced feed rollers 51 and 52 disposed on the inlet or feed side of the machine ahead of the blades 38. These rollers are mounted upon laterally extended rotatable shafts 53 and 54 respectively. The shafts are mounted upon the framework 11 in bearings, as illustrated for example in FIG. 2. The two feed rollers 51 and 52 are horizontally aligned as illustrated in FIG. 3, for example, and there is additionally provided a further feed roller 56 horizontally aligned with the first two rollers but disposed on the opposite side of the cutting mechanism 29 therefrom. This latter roller may be termed the exit roller for convenience of nomenclature and it is mounted in the framework upon a rotatable axle or shaft 57 in the same manner as the feed rollers 51 and 52.

Each of the rollers 51 and 52 and 56 are provided with radially extending and circumferentially spaced spikes 58 preferably formed with sharpened outer ends so as to puncture meat or the like as they engage same and consequently to move such meat by rotation of the rollers. A feed plate 61 is disposed above the feed rollers 51 and 52 with a plurality of longitudinal slots 62 therein for accommodating passage of the roller spikes 58 as the rollers are rotated. It will be seen that the spikes 58 are provided in aligned rows about the roller circumferences so that they fit through the feed plate slot 62. The feed plate extends forwardly of the machine beyond the feed rollers so as to provide a surface upon which meat may be initially placed and then pushed toward the blades into position for engagement by the spikes of the first feed roller 51. Also, this feed plate may have upwardly projecting side members as shown in FIGS. 1 and 2 to limit the lateral position at which meat may be fed into the cutting means of the machine. There is also preferably provided a slotted bar 63 substantially in alignment with the feed plate 61 and disposed in the cutting mechanism with the cutting blades or saws 38 reciprocating vertically in the slots of such bar. Consequently as meat is fed into the cutting means it is prevented from dropping down from the feed plate as it is cut. While it is also possible to provide an exit plate it has been found unnecessary to do so inasmuch as the spikes of the exit roller 56 adequately grip the sliced meat to remove it from the machine.

With respect to the relative lateral locations of feed rollers, spikes and vertical cutting blades, reference is made to FIG. 7 where it will be seen that the feed plate slots 62 and roller spikes extending therethrough are aligned between the blades 38 of the cutting mechanism. Likewise the spikes on the exit roller 56 are located intermediate the blades of the cutting mechanism so as to be in alignment with the spikes on the feed rollers 51 and 52. The second feed roller 52 which actually forces the meat into the cutting means has the spikes thereof located so as to move close to the blades and similarly the exit roller 56 has the spikes thereof moving relatively close to the exit side of the cutting blades so that little opportunity is afforded for the meat before or after cutting to move laterally with respect to the cutting means.

In accordance with the present invention the rollers 51, 52 and 56 are driven to rotate under power. In accordance with the illustrated embodiment of the present invention this is accomplished by a drive chain 71 extending about a sprocket 72 on the drive shaft 17 and also about a sprocket 73 on an idler shaft 74. This idler shaft 74 extends laterally across the framework 11 beneath the feed rollers and is journaled in the framework for free rotation. This idler shaft 74 may extend externally of the framework with a sprocket wheel 76 affixed thereto for rotation with the shaft. A chain drive 77 extends about this external sprocket wheel 76 and about sprocket wheels 78 and 79 upon the ends of shafts 54 and 57 of the spiked rollers 52 and 56. Thus, with operation of the motor 13, the feed roller 52 and exit roller 56 are each rotated in the same direction, i.e., clockwise, as viewed in FIGS. 1 and 3 for example, at the same rate so that meat is fed into the cutting means 29 by the roller 52 and removed in sliced condition by the roller 56 at the same rate. The first or forward feed roller 51 is in turn driven to rotate in a clockwise direction by a drive chain 81, see FIG. 4, extending about sprocket wheels 82 and 83 on the ends of feed roller shafts 53 and 54, respectively. This drive may be located on the opposite ends of the rollers from the motor drive described above. It will thus be seen that each of the lower rollers 51, 52 and 56 are positively driven from the motor 13 to rotate in a clockwise direction, as viewed in the illustration of FIG. 1, for example.

As a further and highly important part of the present invention there is additionally provided an upper feed roller vertically spaced above the feed roller 52 immediately adjacent the blades 58 of the cutting means 29. This upper roller 91 is also driven in the manner noted below so as to rotate in a counterclockwise direction at the same rate as the roller 52 beneath same so that meat is firmly gripped top and bottom as it is fed into the blades. This upper roller 91 is provided in connection with and is mounted upon a holddown plate 92 similar to the one shown in my above-noted patent application. In the present invention, however, this plate is provided with slots 93 through which teeth 94 of the roller 91 extend. As illustrated in FIG. 2 the teeth of the upper roller 91 are preferably aligned with the teeth of the rollers 51 and 52 beneath same. The upper roller 91 may be mounted for rotation in bearings carried by this holddown plate and the upper roller is gear driven by means of a gear 96 on the end of the upper roller shaft 97 and mating with a gear 98 on the end of a shaft 99. This shaft 99 in turn is rotated by means of a sprocket wheel 101 mounted thereon and a drive chain 102 extending thereabout. This drive chain 102 also extends about a sprocket wheel 103 on the end of the feed roller shaft 53 (FIG. 2) and about a third sprocket wheel 104 (FIG. 1). The sprocket 104 is provided for the purpose of tensioning the drive chain 102 for different adjusted positions of the upper feed roller 91. Thus as the lower spiked rollers 51, 52 and 56 are rotated in a clockwise direction as viewed in FIG. 1 and the upper feed roller 91 is rotated in a counterclockwise direction, to thereby cooperate with the feed roller 52 immediately beneath same.

Considering further the operation and purpose of the upper feed roller 91, it is noted that this roller is adapted to be vertically adjusted in accordance with the size of the piece or chunk of meat to be fed through the cutting means of the present invention. Consequently particular provision is made for adjusting the position of the upper feed roller while maintaining the driven relation of same. Structure to this end is illustrated in FIGS. 2, 4, 5 and 6. Referring to these FIGS., it will be seen that the gear shaft 99 is carried in a bearing atop a vertically movable plate 111 fitting in a slot provided in a mounting block 112 that is in turn secured to the rigid upright portion 37 of the framework 11. A holding screw or bolt 113 is threaded through the front portion of the mounting block 112 to bear upon the vertically movable plate 111 for adjustable fixing the position thereof. In this manner then the gear shaft 99 may be moved to engage the gear 98 thereof with the upper feed roller 96 in any vertically adjusted position of the latter.

In order to maintain the drive chain 102 in tension about the sprocket wheels 101 and 103 provision is also made for adjusting the location of the additional idler sprocket wheel 104. This is illustrated in FIG. 5 to be accomplished by a horizontally movable plate 114 fitting in a horizontal slot in the mounting block 112. The shaft 116 of the idler wheel 104 is carried in a bearing on the outer end of this horizontally movable or adjustable plate 114 so that the idler sprocket wheel 104 may be moved toward or away from the upright frame portion 37 to maintain the drive chain 102 in tension. A lock bolt 117 is threaded through a portion of the mounting block 112 for engagement with this horizontally adjustable plate 114 to lock the latter in adjusted position.

It will thus be seen from the portion of the invention described above and illustrated particularly in FIGS. 4, 5 and 6 that the upper feed roller 91 may be vertically adjusted to set the separation between same and the lower feed roller 52 while maintaining the upper feed roller in driven relationship. It is to be particularly noted that the drive sprockets identified above are of equal diameter so that each of the feed rollers rotate at the same rate. Consequently meat that is placed on the feed plate 61 and pushed forwardly into the machine will be originally gripped by the first spiked roller 51 and moved into engagement with the two rotating feed rollers 52 and 91 which firmly grip the piece or chunk of meat and feed it steadily into the vertically reciprocating blades or saws 38. By gripping the meat both top and bottom the invention prevents any tilting, twisting or turning of the meat as it is fed into the cutting means. This is highly important in maintaining uniform cuts and also in preventing possible damage to the cutting means. Should a large piece of meat that is fed into the vertically reciprocating blades be allowed to twist during such operation it is possible to turn or twist the blades and under extreme circumstances even break them. The present invention precludes this possible source of difficulty with a multiple blade meat slicing machine.

It is to be noted that the upper holddown plate 92 carrying the upper feed roller 91 is mounted for movement up and down relative to the feed plate 61 so as to accommodate pieces of meat of varying sizes. The mechanism for mounting and moving the upper holddown plate in the present invention may be substantially the same as that shown and described in my above-noted patent. In brief, it is noted that the rear of the plate at the exit end of the machine may be mounted by means of a pair of upright members 121 extending upwardly from the framework of housing 11 above the lower feed rollers. A short bar 122 at each end of the holddown plate 92 extends from the rear of such plate to one of the uprights 121. These bars 122 may be bolted to the uprights at a variety of vertical positions through openings in the uprights and this then allow some vertical pivoting of the rear end of the holddown plate as may be required to accommodate meat leaving the slicer under the control of the exit roller 56. At the forward end of the holddown plate there is provided an extension 123 extending to a vertical moving pinion of a rack and pinion arrangement 124 in a front upright member 126 extending upwardly from the frame 11. A crank 127 is provided to move the pinion in the rack for raising and lowering the holddown plate 92. It is believed clear that a variety of different mounting means for the upper holddown plate may be provided, with the proviso that such plate shall be vertically adjustable as to position above the feed plate 61 and lower feed rollers. In operation, the upper holddown plate is located in such a position that the spikes 94 of the upper roller 91 extending through the slots 93 of such plate engage the meat as it is fed into the machine and pressed down against the lower feed rollers immediately ahead of the cutting means. This then serves to substantially improve the feeding operation of meat into the cutting means. In particular it is noted that the upper feed roller which is driven to rotate in a counterclockwise direction at the same rate as the feed roller 52 immediately beneath same prevents the meat from binding against the upper holddown plate which may otherwise produce a counterclockwise rotation of the meat adjacent the cutting means as the lower feed roller 52 attempts to force the meat into the blades.

In addition to the highly improved feeding action of the present invention it is also noted that the spiked roller feed means hereof may be formed of stainless steel with stainless steel spikes extending therefrom so is to be readily cleaned in place. A highly sanitary arrangement is thus achieved, for all drive mechanism including sprockets, drive chains and the like are located entirely away from the area or volume of meat handling and cutting. The rollers are easily cleaned in place by one or more streams of hot water with a detergent or the like or possibly with steam under pressure. The feed means do not include any small openings, crevices or the like as are found in chains or other conventional feed means so it is not necessary to disassemble the present machine for complete cleaning thereof after meat cutting operations. As noted above the present invention may be constructed of a relatively large size so as to handle quite large chunks or pieces of meat in a very rapid manner. This then means that portions of the machine are heavily constructed particularly for industrial use to insure precision movements and longevity of operation. Any requirement for removal of these heavily constructed elements is disadvantageous in that they are not readily handled and furthermore the spiked nature of the feed means make them extremely difficult to grip by a person attempting to remove them.

Thus the present invention provides a multiple blade meat slicing machine of advanced and improved structure having a highly advantageous feed mechanism particularly directed to highly sanitary conditions of operation and improved gripping and feeding of meat into the multiple blade arrangement of the cutting machine. Provision is also made for handling of varying sized pieces or chunks of meat to be sliced by the machine. It is noted in this respect that the meat may have bones therein and under such circumstances the slicing mechanism 29 is provided with saw blades which vertically reciprocate to cut the bones as well as the meat. The driven upper feed roller is particularly advantageous in this latter application of the present invention for the positive feed achieved by cooperating upper and lower feed rollers prevents lateral or rotary motion of the meat as it is forced through the cutting means, to insure even slicing and preclude damage to the cutting means themselves.

Although the present invention has been described with respect to a particular preferred embodiment thereof, it is not intended to limit the invention thereof to the precise terms of description or details of illustration. Reference is made to the appended claims for a precise delineation of the true scope of this invention.

I claim:

1. An improved meat slicing machine having a plurality of laterally spaced cutting means movable to cut meat fed therein and a substantially horizontal slotted feed plate ahead of said cutting means comprising:

at least two lower spiked feed rollers disposed substantially horizontally and extending laterally across said cutting means, one on each side thereof, said rollers having spikes extending therefrom for gripping meat and the first roller having the spikes extending through the slots in said feed plate;

an upper holddown plate disposed above said feed plate in vertically adjustable position;

an upper feed roller mounted on said holddown plate with spikes extending downward through slots therein; and drive means rotating said feed rollers to move the spikes thereabout at the same angular rate but rotating the upper feed roller in the opposite direction from the lower feed rollers whereby meat engaged by the upper feed roller and first lower roller is forced into the cutting means for slicing and is withdrawn from the cutting means by second lower roller.

2. The improved meat slicing machine of claim 1 further comprising adjustable connecting means between said drive means and upper feed roller for rotating the upper feed roller at the same rate as the other feed rollers.

3. The improved meat slicing machine of claim 2 further defined by said adjustable connecting means comprising a chain drive extending from a lower feed roller about a drive shaft and an idler sprocket, means for adjusting the vertical position of said drive shaft with adjustment of the vertical position of said upper feed roller to maintain a driven condition of such roller, and means for adjusting the horizontal location of said idler sprocket to maintain chain drive tension in adjusted position of said drive shaft.

4. An improved meat slicing machine comprising a rigid frame mounting cutting means including a plurality of laterally spaced vertically reciprocal blades, a slotted feed plate extending to said cutting means with the slots aligned with spaces between blades, at least one lower feed roller disposed beneath said feed plate and having radial spikes in rows thereabout aligned with and extending through the slots in said feed plate an upper feed roller with rows of radial spikes thereabout disposed adjacent said cutting means above said feed plate in vertically adjustable position, a holddown plate disposed immediately beneath said upper feed roller with slots therethrough aligned with the slots in said feed plate with the upper feed roller spikes extending through said holddown plate slots, and drive means rotating said feed rollers at the same rate with upper and lower feed rollers rotated in opposite directions to move the spikes of each toward said cutting means between the rollers for gripping and uniformly feeding meat into said cutting means.

5. The improved meat slicing machine of claim 4 further defined by another lower feed roller disposed beneath said feed plate ahead of the stated lower feed roller and having rows of radial spikes extending through said feed plate slots, and connections for rotating said other feed roller from said drive means at the same rate and in the same direction as said first lower feed roller for gripping meat and moving same into engagement with said upper and lower feed rollers adjacent said cutting means.

6. The improved meat slicing machine of claim 5 further defined by an exit feed roller horizontally aligned with said lower feed rollers and disposed on the opposite side of said cutting means therefrom, said exit feed roller having rows of radial spikes disposed in alignment with the slots in said feed plate, and means connecting said exit roller to said drive means for rotation at the same rate and in the same direction as said lower feed rollers for gripping and removing sliced meat from said cutting means.